Patented July 21, 1931

1,815,677

UNITED STATES PATENT OFFICE

GIULIO NATTA, OF MILAN, ITALY

PROCESS FOR THE MANUFACTURE OF METHANOL

No Drawing. Application filed March 7, 1929, Serial No. 345,236, and in Italy March 13, 1928.

It is well known that by subjecting mixtures of carbonic oxid and hydrogen to the action of catalyzers at high pressure it is possible to obtain hydrocarbons or oxygenated organic compounds (methane, methyl alcohol, higher alcohols, aldehydes, acids, ethers, etc.) in proportions and with yields which differ greatly according to the experimental conditions and the nature of the catalyzing substances. Certain impurities, present even in relatively small quantity in the catalyzers, may radically alter the course of the synthesis; they may, for example, produce methane instead of alcohols.

On account of the very great variety of products which can be obtained from a single gaseous mixture under the same conditions of temperature and pressure, it is evident that choice of the catalyzer is of the utmost importance, seeing that the catalyzer is the fundamental factor whereon all processes are based which seek to obtain liquid products of greater value from water gas.

Many catalyzers have been proposed for the synthesis of methyl alcohol. These catalyzers, all of which are artificial, are ordinarily obtained by the wet method, and must undergo a preliminary filtration, washing and drying treatment, as well as mechanical treatments for agglomerating them in a suitable compact form. Some require careful preparation, and others have to undergo a reduction treatment previous to being used. Catalyzers have also been proposed embodying as a support or carrier inert materials such as asbestus which dilute the active catalyzer; as well as other catalyzers which are obtained by the addition of foreign substances which act as agglomerants on the mixtures of oxids, themselves pulverulent and, consequently, unsuitable for filling the catalytic space wherein gases circulate, often at high speed. Furthermore, many of the catalyzers proposed are very expensive, particularly those obtained by the addition, as activants, of compounds of certain rare metals such as uranium, thorium, cobalt, etc.

The following process for the synthesis of methyl alcohol and other organic products is based on the use, as catalyzers, of certain minerals which possess a very intense catalytic power even when employed in the same state in which they are found in nature, without any preliminary treatment.

Smithsonite, which is a mineral consisting chiefly of zinc carbonate, as is well known, is extremely active. The raw crystalline mineral, although containing yellowish, reddish, brown and greenish parts due to impurities in the gangue, and although containing foreign matter such as iron, manganese, lime and silica, can, after having been roughly broken up, be introduced directly into the catalyzing towers. When preheated to a temperature close to 400° C., it is ready to be used for the synthesis. Even white smithsonite, which is purer and which has a concretionary, crystalline appearance, possess an intense catalytic property.

Calcined smithsonite cannot, from the point of view of catalysis, be considered as ordinary zinc oxid. This is demonstrated by its extraordinarily high activity which must be attributed to the presence of numerous substances, intimately distributed in the form of homogeneous solid solutions, or of compounds which cannot be obtained artificially. Even the artificial mixtures produced by precipitating the carbonates of zinc simultaneously with those of manganese, iron, calcium, etc., are less active than natural smithsonite. It is known that diffusion in the solid state at temperatures much lower than the fusing point ocurs only very slowly. In natural smithsonite, these solid solutions have had time to form during the extremely long geological ages by crystallization of very dilute solutions; probably under high temperatures and pressures, all of which form a composite of conditions which cannot be reproduced artificially.

Smithsonite can be heated to 400°–450° C., before use, or it may even be introduced just as it is into the synthesis apparatus.

Quantitative comparisons show that with the same conditions of catalytic space, temperature and gas velocity, mineral smithsonite has an enormously greater activity than that of carbonate or oxid of zinc and of chromium (obtained according to the methods described by Patart and by "Badische Soda und Anilin Fab.") which is ordinarily considered to be one of the best catalyzers.

It should be noted that the chief impurities present in smithsonite, particularly the iron, are not harmful but, on the contrary, probably increase the catalytic property. Certain grades of green smithsonite, owing to the presence of ferrous carbonate in isomorphous mixture with the zinc carbonate, can even be used advantageously for the synthesis of the methyl alcohol without involving the contemporaneous formation of methane.

A gas has been treated which was obtained by the action of electrolytic oxygen and steam on carbon by eliminating, by washing, a part of the carbonic anhydride. This gaseous mixture, containing nearly 30% of carbonic oxid, 7% of carbonic anhydride, more than 60% of hydrogen and only traces of oxygen and nitrogen, and being subjected to a pressure of 260–300 atmospheres and to a temperature of nearly 400° C., gave an increase of 20% in the yield for each passage, per liter of gross catalytic space, and with a velocity of the gas of nearly 15 cubic meters per hour, compared to the yield when zinc oxide or carbonate or chromium oxide or carbonate is used as the catalytic agent. The condensed liquid is composed principally of methyl alcohol, and it contains only very small amounts of water. Very highly purified methyl alcohol can then be obtained by simple distillation.

The yield remains fairly high even at temperatures exceeding 400° C. or somewhat lower. It is satisfactory at 340–350° C., and at pressures slightly higher than 100 atmospheres.

The present catalyzer, due to its compactness, possesses the advantageous property of not being subject to localized overheating, and of having a peculiar stability; and even after a prolonged operation with unpurified gases, its catalytic activity is not lessened in the slightest.

Given its remarkable activity, its low cost, its valuable mechanical properties, and its stability, and the fact that it does not require any preliminary treatment, the mineral can be used to great advantage in the synthesis of methyl alcohol.

Moreover, in the case where the gaseous mixture circulates very slowly, it is possible to obtain, besides methyl alcohol, other oxygenated organic compounds of great value.

I claim as my invention:—

1. A process for the synthetic preparation of methyl alcohol and other oxygenated organic substances, comprising the step of subjecting a mixture of carbonic oxid and hydrogen to the catalytic action of mineral smithsonite.

2. A process according to claim 1, in which natural smithsonite is previously heated to 400–450° C.

3. A process for the synthetic preparation of methyl alcohol, comprising the step of subjecting a mixture of hydrogen and an oxide of carbon to the catalytic agent of mineral smithsonite at a pressure above 100 atmospheres and at a temperature of 300–450° C.

4. A process of synthesizing methyl alcohol, which comprises passing a mixture containing hydrogen and an oxide of carbon over a layer of catalyzer composed of smithsonite maintained at a temperature of about 400° C. and at a pressure above 100 atmospheres, cooling the resultant gaseous mixture to form a liquid, and distilling the methyl alcohol from the liquid.

5. A process according to claim 3, in which the smithsonite has previously been heated to temperature of 400–450° C.

6. A process of synthesizing methyl alcohol from a mixture of hydrogen and the oxide of carbon wherein smithsonite is the catalyzing agent.

In testimony whereof I affix my signature.

GIULIO NATTA.